(12) United States Patent
Schumann, Jr.

(10) Patent No.: US 10,339,605 B2
(45) Date of Patent: *Jul. 2, 2019

(54) COMPUTER SYSTEM FOR GENERATING NON-KEYBOARD TYPE DATA ENTRY INTERFACES ON REMOTE USER DEVICES

(71) Applicant: HARTFORD FIRE INSURANCE COMPANY, Hartford, CT (US)

(72) Inventor: Douglas D. Schumann, Jr., Wethersfield, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,500

(22) Filed: Apr. 30, 2018

(65) Prior Publication Data

US 2018/0247377 A1  Aug. 30, 2018

Related U.S. Application Data

(63) Continuation of application No. 15/626,651, filed on Jun. 19, 2017, now Pat. No. 9,984,422, which is a continuation of application No. 14/450,700, filed on Aug. 4, 2014, now Pat. No. 9,684,933, which is a continuation of application No. 13/479,523, filed on May 24, 2012, now Pat. No. 8,799,125.

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC .............................. G06Q 40/00; G06Q 40/08
See application file for complete search history.

(56) References Cited

U.S. PATENT DOCUMENTS

| | | |
|---|---|---|
| 7,490,050 B2 | 2/2009 | Grover et al. |
| 2003/0139948 A1 | 7/2003 | Strech |
| 2008/0066020 A1 | 3/2008 | Boss et al. |
| 2008/0221934 A1 | 9/2008 | Megdal et al. |
| 2009/0070152 A1 | 3/2009 | Sperske et al. |
| 2009/0177501 A1 | 7/2009 | Grover et al. |
| 2010/0036686 A1 | 2/2010 | Olivier et al. |
| 2010/0174563 A1 | 7/2010 | Lazenga |
| 2010/0174564 A1 | 7/2010 | Stender et al. |
| 2010/0223078 A1 | 9/2010 | Willis et al. |
| 2011/0022416 A1 | 1/2011 | Berquist et al. |
| 2011/0166893 A1 | 7/2011 | McConnell et al. |
| 2012/0010906 A1 | 1/2012 | Foladare et al. |
| 2012/0016694 A1 | 1/2012 | Freudman |
| 2012/0022898 A1 | 1/2012 | Koa |

(Continued)

*Primary Examiner* — Lalita M Hamilton
(74) *Attorney, Agent, or Firm* — Howard IP Law Group

(57) ABSTRACT

A computer system for interaction with user devices presenting a keyboardless data entry interface and third party data systems is configured to provide data for display on a user device of a selectable input graphical user interface, the graphical user interface including a series of user selectable inputs not requiring user keyboard-type information entry. The system is configured to obtain data from a user device and from third party computer systems. The system is further configured to determine an insurance quotation based on inputs via the graphical user interface not requiring user keyboard-type information entry and the data from one or more of the user device and third party computer systems.

20 Claims, 8 Drawing Sheets

(56) References Cited

U.S. PATENT DOCUMENTS

| | | |
|---|---|---|
| 2012/0054095 A1 | 3/2012 | Lesandro et al. |
| 2012/0066004 A1 | 3/2012 | Lee |
| 2012/0109692 A1 | 5/2012 | Collins et al. |
| 2012/0166228 A1 | 6/2012 | Singleton et al. |
| 2013/0060582 A1 | 3/2013 | Cutino et al. |
| 2013/0066656 A1 | 3/2013 | Hanson et al. |
| 2013/0073388 A1 | 3/2013 | Heath |
| 2013/0073473 A1 | 3/2013 | Heath |

COMPUTER SYSTEM FOR GENERATING NON-KEYBOARD TYPE DATA ENTRY INTERFACES ON REMOTE USER DEVICES

CROSS-REFERENCE TO RELATED APPLICATIONS

The present application is a continuation of copending U.S. patent application Ser. No. 15/626,651 entitled Computer System For Generating Keyboardless Data Entry Interfaces On Remote User Devices, filed on Jun. 19, 2017, which application is a continuation of U.S. patent application Ser. No. 14/450,700 entitled Computer System For Interaction With User Devices Presenting A Keyboardless Data Entry Interface And Third Party Data Systems, filed on Aug. 4, 2014, now U.S. Pat. No. 9,684,933, which application is a continuation of U.S. patent application Ser. No. 13/479,523 entitled System and Method for Rendering Dynamic Insurance Quote Interface, filed on May 24, 2012, now U.S. Pat. No. 8,799,125, the entire contents of each of which are incorporated herein by reference for all purposes.

BACKGROUND

The purchase of a new home or automobile necessitates acquiring a new home or automobile insurance policy, or is likely to result in a change of rates under an existing policy. Dissatisfaction with one's current insurer may also result in a consumer shopping around for better pricing and/or services provided by another insurer. The process of obtaining an insurance quote for automobile or home insurance is generally a several step endeavor. Generally, a consumer has to decide between a number of different insurance providers and then initiate the quotation process that may include communicating with an insurance agent of the selected provider or logging onto an insurance provider's website. Generally, the agent and/or web site will then solicit a number of pieces of information from the individual consumer to help finalize a quotation. For example, for automobile insurance, information such as the drivers license number, make and model of vehicle, mileage, approximate annual use of the vehicle, how many household drivers and ages, general driving history, VIN number for vehicle to be insured, a list of the vehicle's safety and anti-theft devices, policy numbers of existing polices to potentially qualify for multi-policy discounts, address of individual, etc. may be needed to formulate an insurance quotation.

Providing this information for the quote inevitably requires some manual information entry by the agent on behalf of the consumer or by the consumer directly such as via their personal computer when interfacing with an online quoting engine. Such manual information entry is more cumbersome with today's generation of smartphones and tablet computing devices that typically do not have physical keyboards and thus require manipulation of virtual softkeys or other methods that are more error prone. Generally, the longer the quotation process takes, the more chance the potential customer will simply abandon the quote or seek other alternatives.

Accordingly, it would be desirable to have a system that could provide instant and accurate automobile insurance quotes without requiring any time-consuming manual entry through an easy to use, intuitive user interface. It would also be further desirable to have an automated quoting system that could intelligently utilize third party data, geo-location data and social networking data to expedite the quotation process.

SUMMARY

In one embodiment, the present invention is a system for administering dynamic insurance quotations, the system comprising one or more processors; a memory coupled to the one or more processors; and one or more programs, wherein the one or more programs are stored in the memory and configured to be executed by the one or more processors, the one or more programs including instructions for: displaying an insurance quote application graphical user interface, detecting one or more user selectable inputs in the application interface, wherein the user selectable inputs include a plurality of option selections, each respective option selection representative of insurance quotation specific information pertaining to the user, and in response to detecting user selections, initiating one or more user device and/or third party information requests; and outputting an insurance quotation based on the information conveyed via the option selection icons without requiring additional manual keyboard based input on behalf of the user, wherein the quotation is also at least based in part on information from the user device and/or the third party.

In other embodiments, the present invention is a computer system for calculating real time insurance quotations without requiring keyboard data entry, comprising a processor; and a memory storage device in communication with the processor; the processor configured to: interrogate a user device for identifying information; transmit the identifying information via a communications network to an insurance operated web server; display a graphical user interface to solicit input from the applicant, wherein the graphical user interface requires no keyboard-type information entry from the applicant; receive information via the communications network from the applicant's input via the graphical user interface; and determine, based on the received information if additional information is required to provide the insurance quotation, and if additional information is needed, formulate and transmit a third party information request; and determine a binding insurance quotation for the applicant based on the device information, applicant input and third party information.

In additional embodiments, the invention is a computer-implemented method for administering insurance quotations via a selectable input based graphical user interface, comprising receiving, via a communications interface, device and/or third party driving data related to the user, storing, via a data storage device, the third party driving data related to the user, providing the selectable input graphical user interface, the interface including a series of user selectable inputs, each input related to the device and/or third party driving data related to the user, receiving, via the communications interface, user selected inputs from the selectable input graphical user interface, storing, via a data storage device the received user selected inputs, determining, via the computer processor, insurance quotation information for the user based on the user selected inputs and the third party driving data and outputting an electronic insurance confirmation to the user.

BRIEF DESCRIPTION OF THE DRAWINGS

A more detailed understanding may be had from the following description, given by way of example in conjunction with the accompanying drawings wherein.

DETAILED DESCRIPTION

Disclosed herein are processor-executable methods, computing systems, and related technologies for the management, tracking and communication of insurance quotations using a simplified and improved graphical user interface. The graphical user interface of the present invention utilizes selectable inputs such as dynamic checkboxes and radio buttons to convey user/applicant information to an insurance entity for the purpose of the providing the user/applicant with a real-time bindable quotation for auto, home or other insurance. The system also automatically leverages user device information as well as third party and social network information to augment the user provided information for the quotation in a manner transparent to the user. The system uses a tiered algorithm to expedite the quoting process by selectively and intelligently accessing information to augment the user provided selectable input information so that a minimal amount of user input is required. Utilizing embodiments of the present invention, an applicant can obtain an insurance quotation without having to manually type in or key any type of identifying, historical or descriptive information and thus the applicant benefits from the enhanced user experience and the insurance entity benefits by retaining a higher percentage of potential customers that would otherwise be lost with conventional quoting processes.

Figure 1:
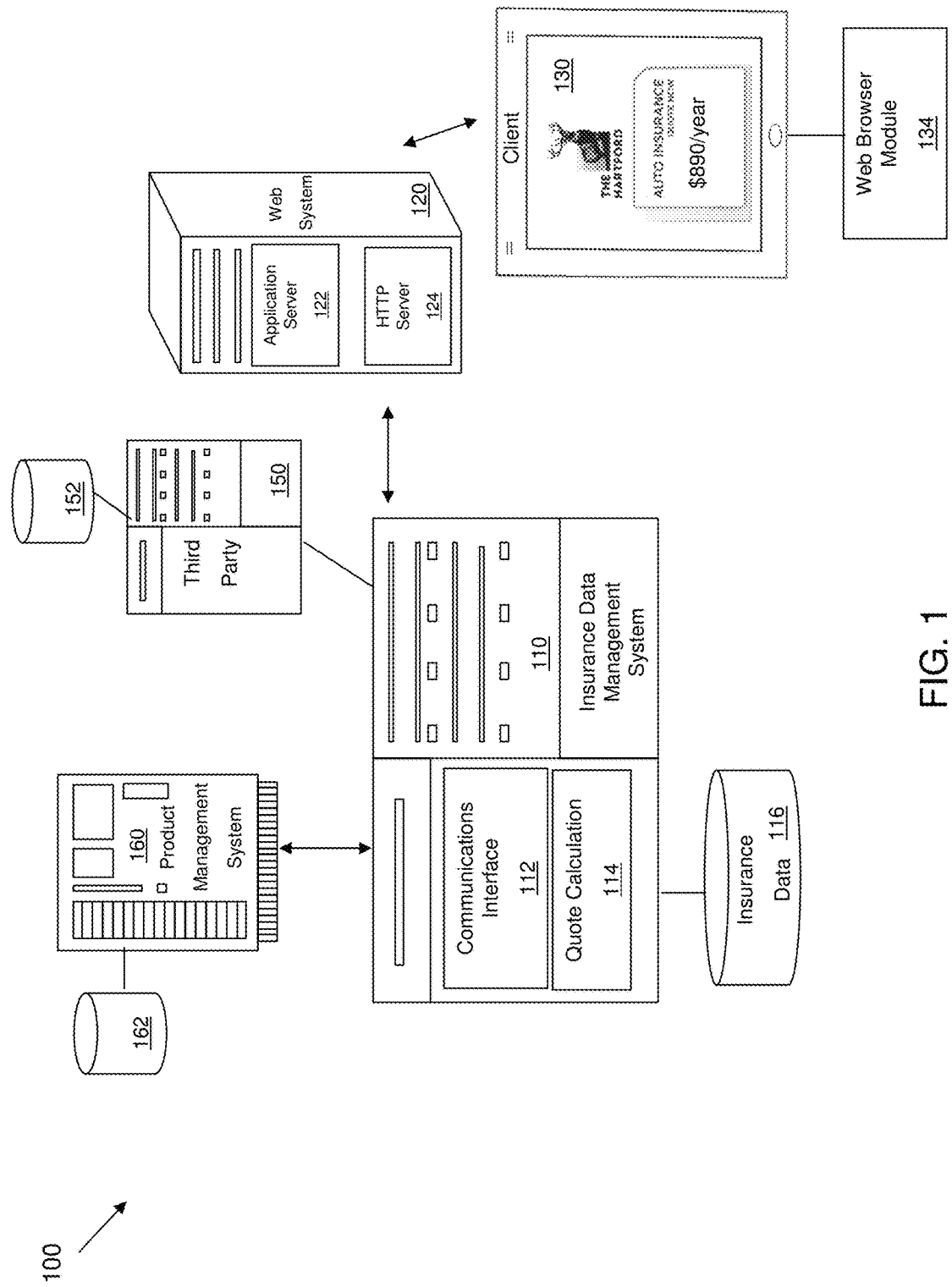
FIG. 1 shows an exemplary computer architecture that may be used for insurance quote administration and management.

FIG. 1 shows an example architecture 100 that may be used for the management, tracking and processing of dynamic insurance quotations using an improved graphical user interface. The example architecture 100 may include an insurance data management system 110, a web system 120, a client device 130, one or more third party data sources 150 and a product management system 160. In the example architecture 100 of FIG. 1, the insurance data management system 110 and the product management system 160 may be under the control of an insurance/financial services company and their associated agents/brokers as applicable. In other embodiments, insurance data management system 110 may be integrated with product management system 160.

Referring still to FIG. 1, the insurance data management system 110 may include a communications interface module 112, an insurance quote calculation module 114, and an insurance information database 116. The insurance quote calculation module 114 may include one or more software modules or objects and one or more specific-purpose processor elements to perform the calculations and processing required by the present invention. In some embodiments, the insurance quote calculation module 114 may also include one or more business rules and one or more predictive models. The business rules may provide guidelines on how to rate and quote entities based on certain types of information. Other business rules may be implemented in accordance with the present invention.

In operation with respect to an automobile insurance quoting process, the insurance quote calculation module 114 may receive client data such as drivers license number, make and model of vehicle, mileage, approximate annual use of the vehicle, how many household drivers and ages, general driving history, VIN number for vehicle to be insured, a list of the vehicle's safety and anti-theft devices, policy numbers of existing polices, the address of individual, etc. provided through the selectable input interface on client device 130. Insurance quote calculation module 114 may also receive or access certain third party data, such as motor vehicle department data, social network information, as well as other third party sources of information via third party server 150 and third party database 152.

Insurance quote calculation module 114 is configured to output one or more quotations for one or more insurance/financial services products such as home or automobile insurance for review and approval by the user. The recommendations may take into account the user's selectable inputs provided, device data, social network data, third party data related to the user, geo-location data as well as the characteristics of the financial service/insurance product such as the fees associated with the product, the term and rate of each product and other related factors.

The insurance information database 116 may store information such as rating and underwriting information and tables, the user provided selectable input, device data, social network information, and third party data information related to the user/applicant. Insurance information database 116 may be spread across one or more computer-readable storage media, and may be or include one or more relational databases, hierarchical databases, object-oriented databases, one or more flat files, one or more spreadsheets, and/or one or more structured files. Insurance information database 116 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance data management system 110 and the other elements in the example architecture 100 of FIG. 1 may be performed via the communications interface 112 in the insurance data management system 110. The insurance data management system 110 may also access third party systems 150 and third party data 152 which may include motor vehicle department data, driving history, social network history and activity and other sources of information which may impact the insurance determinations herein. For example, insurance data management system 110 may interface with computer systems associated with one or more third party sites to receive data related to a user of client device 130 such as the applicant's driving habits, risk profiles, and interests. For example, third party sites may include e-commerce sites, civic networking sites, automobile sites, social networking sites, municipal and governmental sites, and other variety of sites accessible via networks such as the Internet. Information from such sites, including social network information, may include data relating to one or more of an applicant's driving habits, risk profile and driving history. Date received from such sites may be used to classify applicants as high, medium or low risks and price the quotation appropriately based on the determined classification. Data received from such sites may also be used on a state specific basis to help determine the appropriate amount of coverage and limits. For example, a Department of Insurance database on a per state basis may be accessed to determine the appropriate amounts for bodily injury liability limits and property damage liability limits for the user's respective state.

Referring still to FIG. 1, the product management system 160 may perform functionality such as storing and processing information related to certain insurance products. For example, the product management system 160 may include information on certain types of insurance products such as the product characteristics, benefits, features, deductibles, limits, etc. The product management system 160 may store this information in a product management database 162. The product management database 162 may also be spread across one or more computer-readable storage media, and may be or include one or more relational databases, hierarchical databases, object-oriented databases, one or more flat files, one or more spreadsheets, and/or one or more structured files. As will be described in further detail below, the insurance data management system 110 may use information from the product management database 162 to select and sell potential products which may be suitable for one or more applicants based on their information and needs.

Referring still to FIG. 1, web site system 120 may provide a web site that may be accessed directly by a consumer operated user client device 130. User client device 130 can include, but is not limited to cellular telephones, other wireless communication devices, personal digital assistants, pagers, laptop computers, tablet computers, smartphones, or combinations thereof. In embodiments of the present invention, user client device 130 may communicate with the web site system 120 that may be operated by or under the control of a financial services/insurance entity or other third party administrative entity such as a TPA type entity. The web site system 120 may, in response to an initial request from consumer client device 130, interrogate the consumer client device for identifying information. In response to the interrogation, the consumer client device may be configured to provide identifying information, such as identifying information stored in local storage devices, such as device type, serial number, machine number, evercookies, flash cookies, session beans, or session IDs, or may be configured to generate a screen display to prompt a user to input identifying data such as user ID and password, name, address, existing insurance policy or account data, or other identifying data, which identifying information is then transmitted by consumer client device 130 to web site system 120. The web site system 120 may generate one or more web pages for access by consumer client device 130, and may receive responsive information from the consumer client device 130 such as user selectable information for obtaining an insurance quotation. The web site system 120 may then communicate this information to the insurance data management system 110 for processing via communications interface 112. The web site system 120 may also communicate one or more web pages to the consumer client device 130 that provide one or more product options that may be suitable for the consumer from product management system 160.

In operation, client device 130 may be used to provide information via the selectable inputs and also approve and/or select one or more of the insurance product options in accordance with the needs of the consumer operating client device 130. Selection via client device 130 may be accomplished via a touch-sensitive touch screen that provides an input interface and an output interface between the client device 130 and the client or user. In operation, the client device 130 displays certain visual output or indicia to the user for manipulation by the user. The visual output may include checkboxes, radio buttons, graphics, text, icons, video, and any combination thereof. The touch screen may display one or more graphics within user interface displayed on client device 130. In this embodiment, as well as others, a user may select one or more of the graphical elements by making contact or touching the graphics, for example, with one or more fingers or stylus implements. In some embodiments, selection of one or more checkboxes, radio buttons or other graphical indicia occurs when the user establishes and breaks physical screen contact with the one or more graphical elements. In some embodiments, the contact may include a certain gesture, such as one or more finger or stylus taps, one or more swipes such as from left to right, right to left, upward and/or downward and/or a rolling of a finger or stylus such as from right to left, left to right, upward and/or downward that has made contact with the device 130. For example, the user may be provided a series of user selectable input screens that the user may tap to make selections and then swipe to more to additional or nested screens that require additional user selections.

The graphics displayed on client device 130 do not require manual keyboard based input, or keyboard-type information entry, whether via a hardware keyboard or via virtual softkeys. In an embodiment, the input interface may not accept keyboard-type information entry from a user. In some embodiments, the input interface may be configured to accept keyboard-type information entry as an alternative to non-keyboard based data input, such as via selection of graphical elements not displayed as a keyboard. Keyboard based data input includes data input via a hardware keyboard, including mechanical keys displaying alphanumeric symbols arranged generally in a two-dimensional array, and data input via a virtual keyboard on a touch sensitive display, displaying virtual keys having alphanumeric symbols arranged generally in a two-dimensional array. Non-limiting examples of arrangements of two-dimensional arrays include the QWERTY keyboard, the Dvorak keyboard, and the telephone keypad arrangements.

The web site system 120 may include a HyperText Transfer Protocol (HTTP) application server module 124 and an insurance/financial web application module 122. The HTTP server module 124 may implement the HTTP protocol, and may communicate HyperText Markup Language (HTML) pages and related data from the web site to/from the consumer client device 130 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy. The insurance/financial web application module 122 may generate the web pages that make up the web site and that are communicated by the HTTP server module 124. The insurance/financial web application module 122 may be implemented in and/or based on a technology such as Active Server Pages (ASP), PHP: Hypertext Preprocessor (PHP), Python/Zope, Ruby, any server-side scripting language, and/or any other appropriate technology.

Referring still to FIG. 1, the consumer client device 130 may include a web browser module 134, which may communicate data related to the web site to/from the HTTP server module 124 and the insurance/financial web application module 122 in the web site system 120. The web browser module 134 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the consumer client device 130, such as a liquid crystal display (LCD) display, organic light-emitting diode (OLED) display, touch screen or monitor. The consumer client device 130 may receive input from the user of the consumer client device 130 from input devices that are included in or connected to the consumer client device 130, such a mouse or other pointing device, or a touch screen, and provide data that indicates the input to the web browser module 134.

The example architecture 100 of FIG. 1 may also include one or more wired and/or wireless networks (not depicted), via which communications between the elements 110, 120, 130, 140, 150 and 160 in the example architecture 100 may take place. The networks may be private or public networks, and/or may include the Internet. In one example deployment scenario, the insurance data management system 110, web site system 120, and product management system 160 may communicate via one or more private networks that are under the control of the financial services/insurance company, while the consumer client device 130 may communicate with the web site system 120 via the Internet.

Each or any combination of the modules 112, 114, 122, 124, and 134 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112, 114, 122, 124, and 134 may perform functionality described later herein.

Figure 2:
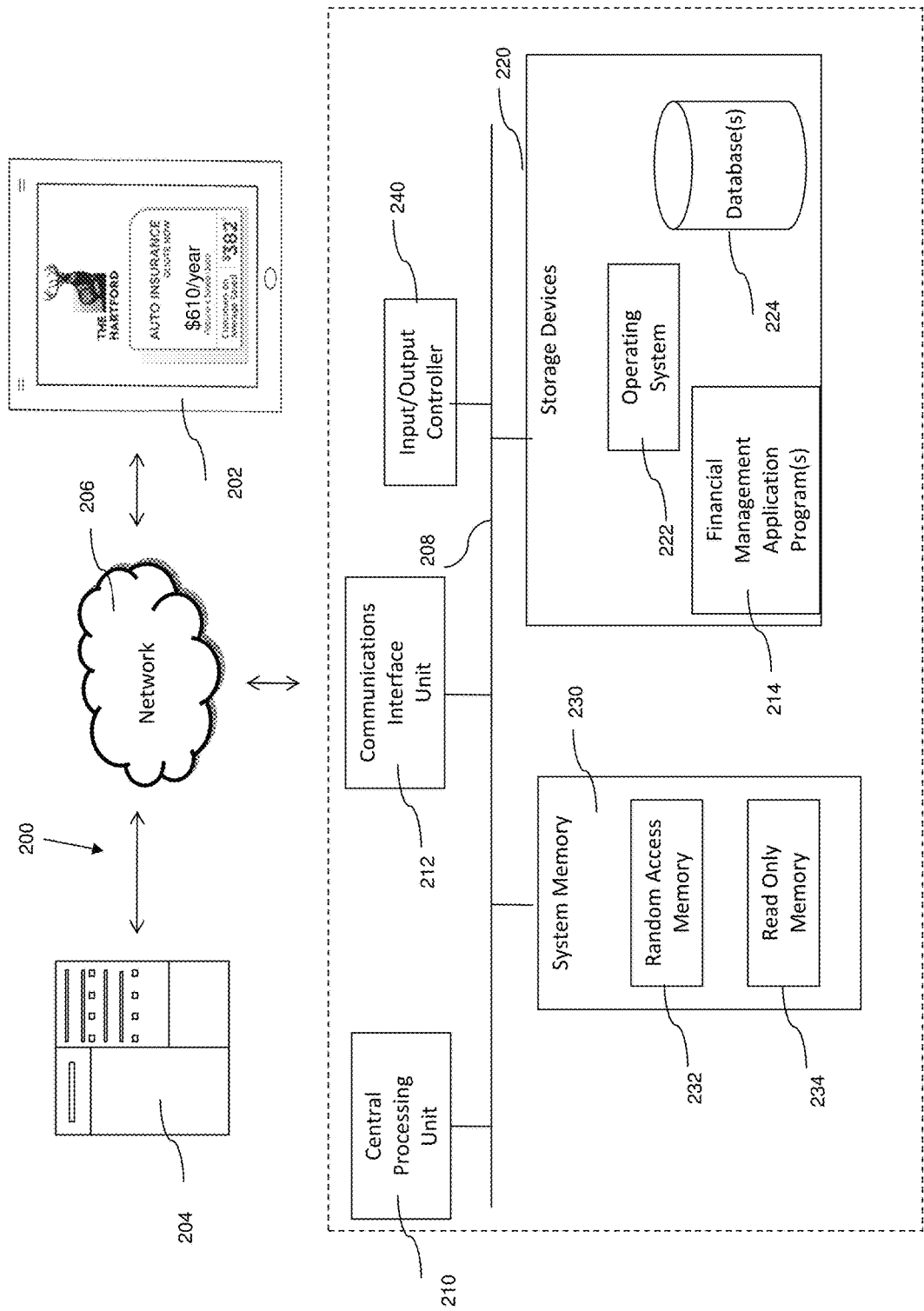
FIG. 2 shows an exemplary system that may be used for the management of insurance quotations.

Referring to FIG. 2, an exemplary computer system 200 for use in an implementation of the invention will now be described. Computer system 200 may be configured to perform quotation processing and management for one or more users, applicant, clients or customers operating a device such as client device 202. System 200 may interface with an insurance/financial services company system or server 204 via a network 206. In computer system 200, a central processing unit or processor 210 executes instructions contained in programs such as financial management application program 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 208 and/or other data channels, with communications interface unit 212, storage devices 220, system memory 230, and input/output controller 240. System memory 230 may further include a random access memory 232 and a read only memory 234. Random access memory 232 may store instructions in the form of computer code provided by application 214 to implement the present invention. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from storage devices 220, which may include connecting to storage devices 220 and obtain data or read data from the storage devices, or place data into the storage devices. Storage devices 220 may include local and network accessible mass storage devices. Storage devices 220 may include media for storing operating system 222 and mass storage devices such as storage 224 for storing data related to insurance information related to the customers such as driving history, etc. Communications interface unit 212 may communicate via network 206 with other insurance/financial services company computer systems such as company system servers 204 as well as other servers, computer systems of agents, financial advisors, customers, remote sources of data, and with systems for implementing instructions output by processor 210. Insurance/financial services company server 204 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP. Network 206 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of the present invention, including computation or determination of a premium for transmission to a user/application. Cloud based computing may be used herein to handle any one or more of the application, storage and connectivity requirements of the present invention. Furthermore, any suitable data and communication protocols may be employed to accomplish the teachings of the present invention.

With reference still to FIG. 2, communications interface 212 is used for receiving user data related to the user's insurance requirement and background. Computer processor 210 executes program instructions, such as provided by application 214 to receive, via the communications interface 212, third party data, social network data and other related information. Database 224 may include data such as historical data from the user or other third parties for use in the quoting process.

Figure 3:
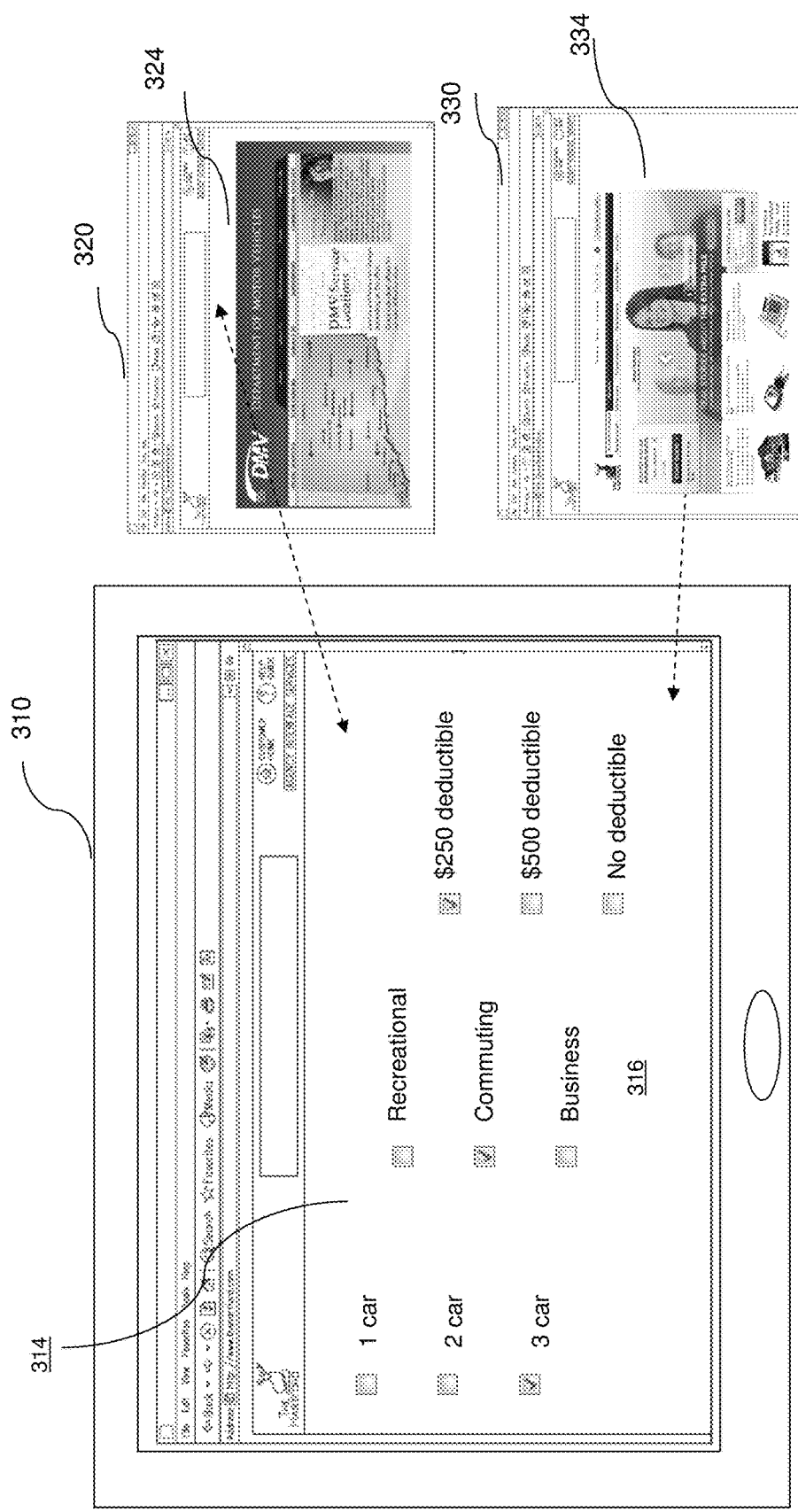
FIG. 3 shows an exemplary system screen of the present invention.

FIG. 3 illustrates an exemplary screen of the present invention as may be displayed among devices shown in FIGS. 1 and 2. In one embodiment, a user operates a device 310, such as a touch screen type device for viewing and accessing information and data related to the insurance quotation process described herein. Touch screen device 310 can be an active sensor employing capacitive, resistive, inductive, or other methods, or it can be a passive surface on which touch sensing is accomplished by optical, acoustic, or other similar methods. Device 310 can also be a liquid crystal display (LCD), organic light emitting diode (OLED) display, electroluminescent display, or any other type of small display suitable for mounting in a portable computer or mobile device. Device 310 may be color or monochrome, and may include a backlight capability to enhance readability in various lighting conditions. In the present invention, device 310 displays a web document 314 for access by a user. Web document 314 operates as a graphical user interface that may include selectable input screen 316 for selecting inputs related to the insurance quote. The selectable inputs may be in the form of graphical checkboxes that may be implemented in a variety of manners. Once a selectable input is selected or actuated by a user, the system may initiate one or third party information requests to augment the quotation information. In one exemplary implementation the user selectable checkboxes as shown in screen 316 may be implemented in a web page as shown in the following exemplary pseudo code:

```
<head>
<title>The Hartford Insurance Quotation System</title>
</head>
<body>
<form name="InsuranceQuotationForm"
action="http://www.thehartford.com/quotationform.cgi"
method="POST">
<div align="center"><br>
<input type="checkbox" name="option1" value="1 Car"> 1 Car<br>
<input type="checkbox" name="option2" value="2 Car" > 2 Car<br>
<input type="checkbox" name="option3" value="3 Car" checked>
3 Car<br>
<if_car "checked", initiate request for device and/or third party
information>
<br></div> </form> </body>
```

As shown above, each of the checkboxes are user selectable inputs that include a plurality of option selections where each respective option selection representative of insurance quotation specific information pertaining to the user. In operation, the system in response to detecting user selections, initiates one or more user device and/or third party information requests such as a request for identifying information from the user device or motor vehicle information from the department of motor vehicles. In this specific example, the user selected a quotation for "3 cars" so the system would initiate make, model and/or Vehicle Identification Information (VIN) requests for the three cars associated with the user from one or more third party information sources. In embodiments of the present invention, the system would iteratively solicit user selectable input with each input potentially triggering additional automated third party information augmentation requests until the requisite amount of information is compiled in order to provide the user with an insurance quotation.

Web page or document 314 may be in communication with one or more third party entities 320 such as a federal, state or municipal entity such as a department of motor vehicles website 324. Web document 314 may interface with third party entity site 324 to obtain historical information associated with the user such as driving history, etc. This information may be used alone, combined with other third party or social network data, or used with the assistance of a predictive model. The predictive model(s) of the present invention may include one or more of neural networks, Bayesian networks (such as Hidden Markov models), expert systems, decision trees, collections of decision trees, support vector machines, or other systems known in the art for addressing problems with large numbers of variables. In embodiments, the predictive models are trained on prior data and outcomes using a historical database of insurance related data and resulting correlations relating to a same user, different users, or a combination of a same and different users. In embodiments of the present invention, the predictive model may be implemented as part of insurance quote calculation module 114 described with respect to FIG. 1.

Device 310 may also be in communication with a insurance/financial services entity operated website 330. Website 330 displays information 334 on one or more insurance/financial services product(s) that have been determined to be suitable for the consumer based on their inputs and selections. It is contemplated that the functionality of website 330 may be integrated within web document 314 such as in a frame, window or other manner so that access to information 334 may be accomplished in a single screen 314 such as shown with that provide for viewing and selection of one or more financial services/insurance related products during the quotation process.

Figure 4:
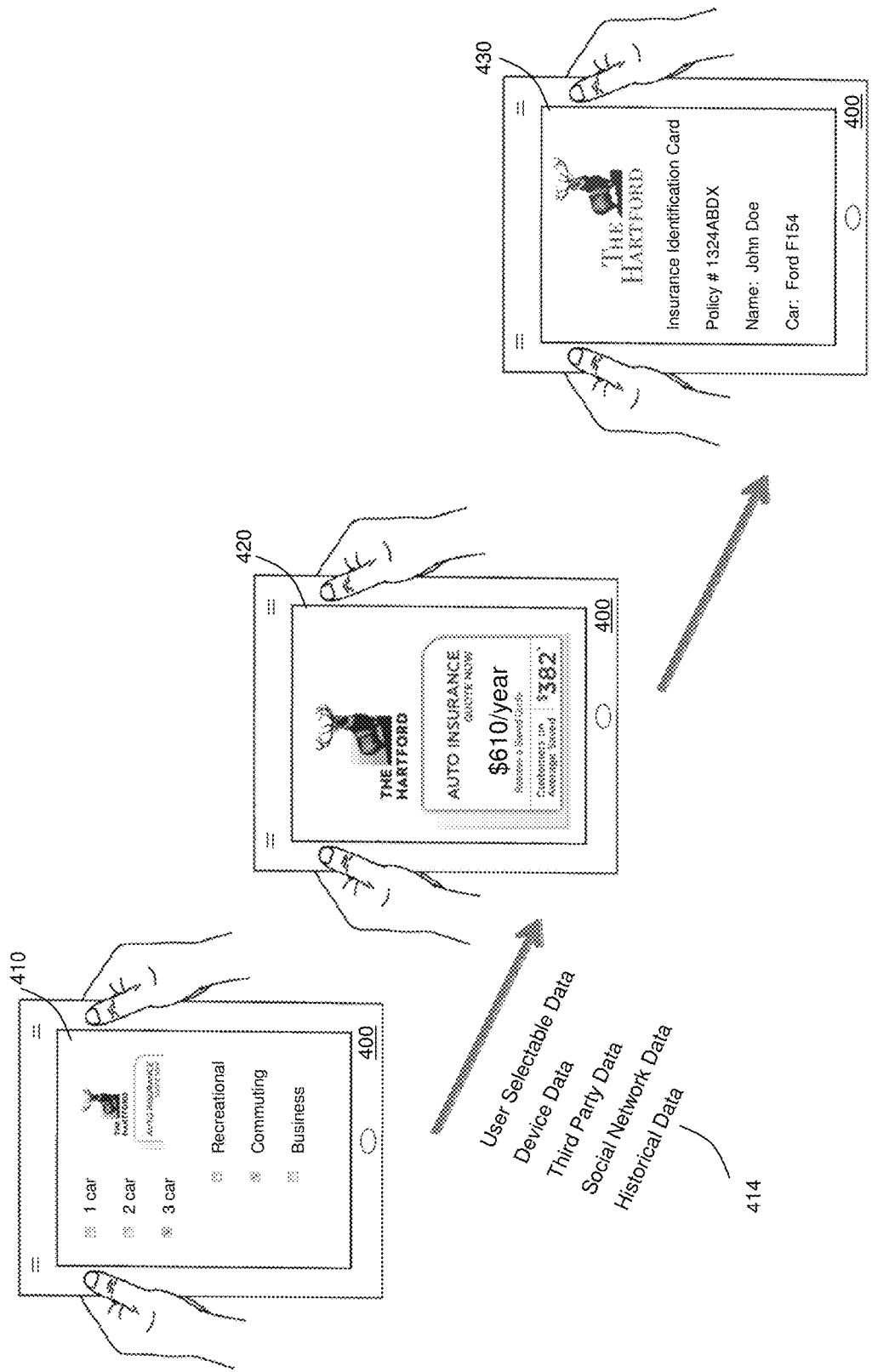
FIG. 4 shows an exemplary system device in operation.

Turning now to FIG. 4, an exemplary user device 400 is illustrated displaying successive steps of a quotation process in accordance with the present invention. Device 400 displays a quotation web page or document 410 that may be generated by the insurance data management system 110 shown relative to FIG. 1. Document 410 is configured to receive certain information and input on behalf of the user through a series of dynamically rendered selectable user inputs provided on user device 400. Such information and input provided by the user in response to the questions is then stored such as in a data storage device described with respect to FIGS. 1 and 2. Web document 410 is configured to receive input from the user regarding their insurance profile such as in the case of automobile insurance, the number of cars they are seeking to insure, how they are going to use the cars, desired deductible, etc. In operation, the user moves from one selectable user input field to another form field to complete each selected data request or question displayed in each form field. An electronic pop-up type display may be available in document 410 for one or more of the fields to provide additional assistance or clarification with respect to one or more of the form fields if requested by the user through a specified action, such as by double clicking or tapping the relevant selectable input.

In the present invention, device 400 may be a touch sensitive display that is responsive to a finger, a stylus, etc.

for manipulation and completion of form 410. Certain operating circuitry may control or operate device 400 to show different respective images, such as, for example, selectable inputs, text instructions or information, icons or functions of a graphical user interface (GUI), lists of information, etc., as is known. Device 400 further is operative to display an insurance quotation, which may be a binding insurance quotation, such as shown in screen display 420 that may be determined based upon the aggregated information of user selectable based data, device data, third party data, social network data and historical data 414. Upon acceptance of the quotation shown in screen display 420, the user may be provided an electronic insurance identification card shown in screen display 430, or instructions for accessing an electronic insurance identification card.

Figure 5:
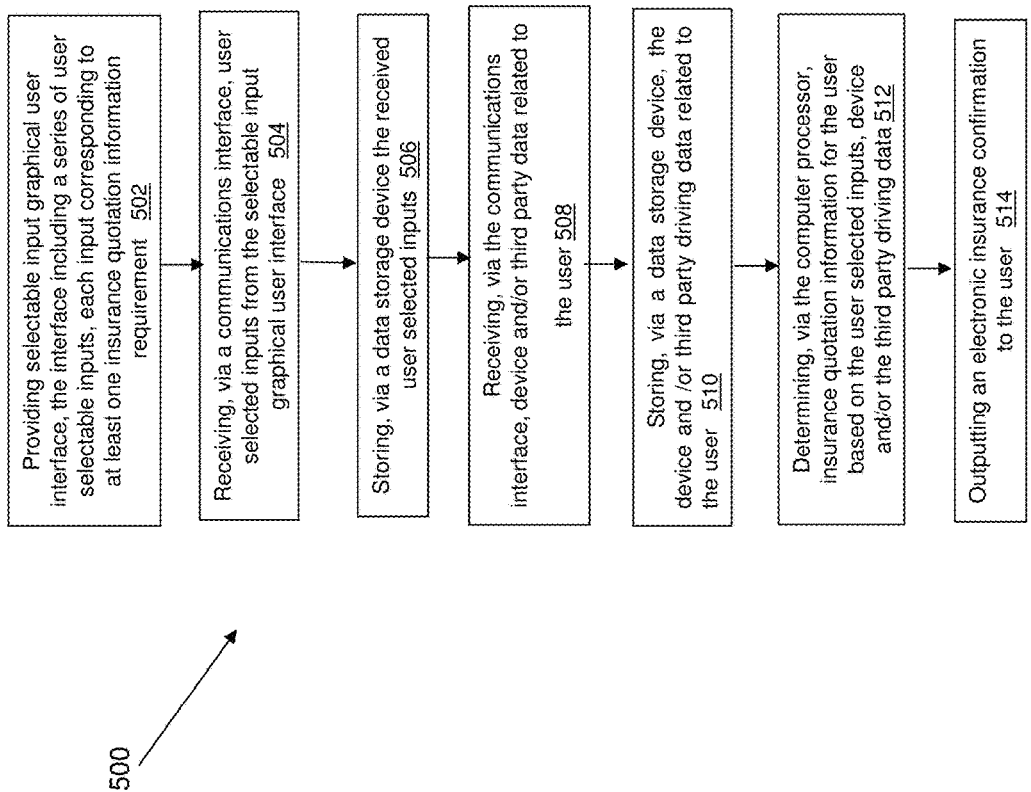
FIG. 5 shows an exemplary method of the present invention.

FIG. 5 shows an example process flow diagram illustrating a method 500 for administering an electronic insurance quoting process using the example architecture 100 of FIG. 1. The method 500 of FIG. 5 may begin by providing a selectable input graphical user interface, the interface including a series of user selectable inputs, each input corresponding to at least one insurance quotation information requirement, step 502. Method 500 continues with receiving, via a communications interface, user selected inputs from the selectable input graphical user interface, step 504. Method 500 continues with storing, via a data storage device the received user selected inputs, step 506. Method 500 proceeds with receiving, via the communications interface, device and/or third party data related to the user, step 508. Method 500 further proceeds with storing, via a data storage device, the device and/or third party driving data related to the user, step 510. Method 500 further continues with determining, via the computer processor, insurance quotation information for the user based on the user selected inputs, device data and/or the third party driving data, step 512. Method 500 proceeds with outputting an electronic insurance confirmation to the user, step 514.

Figure 6:
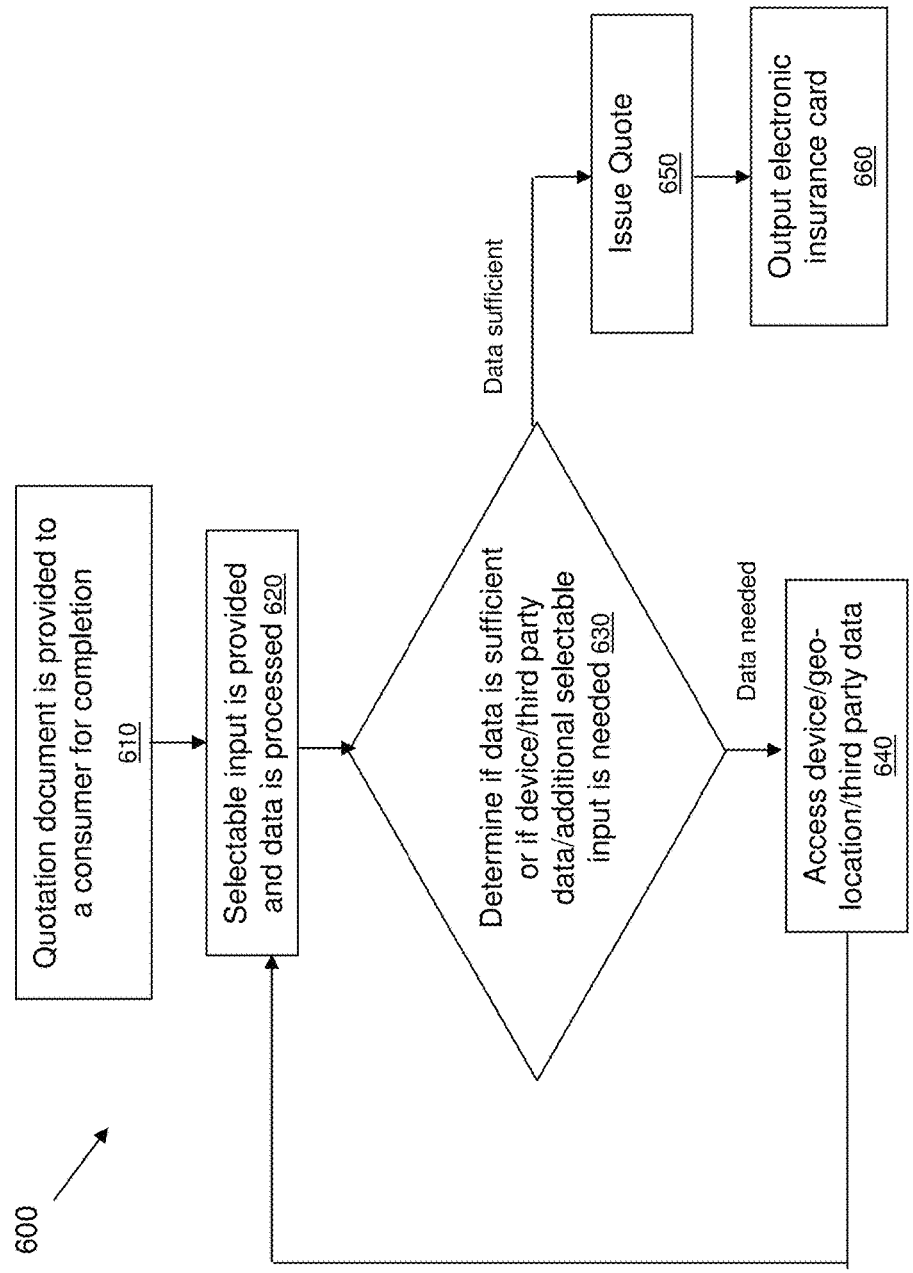
FIG. 6 shows another exemplary method of the present invention.

FIG. 6 shows a process flow diagram illustrating another computer implemented method 600 of the present invention. In an embodiment, an electronic quotation document is provided to a consumer for completion, step 610. Electronic quotation document may be rendered via web system 120 such as described with respect to FIG. 1 and FIG. 2. Selectable input is provided by the applicant user and the data is processed, step 620. For example, the user may select or actuate one or more of the radio button, clickboxes or other graphical indicia displayed by the system to convey the insurance related information to the insurance entity. The system determines if the selectable input is sufficient or if certain device/third party data/additional selectable input is needed, step 630. For example, if the applicant specifies that he/she has two cars that need to be insured, the system may then automatically poll or access in real time certain department of motor vehicle data about the two automobiles. By way of further example, if the applicant specifies that he/she has a child that will also need insurance, the system may access certain social networking information in real time about the child such as their age, interests, education status, etc. to determine a potential level or risk associated with the child. Certain insurance related data, such as third party data, geo-location data and social network information is accessed, received and evaluated, step 640. This process proceeds iteratively so that every successive selectable input provided by the user may be augmented or supplemented by the device data, third party data or otherwise. Once the level of data provided by the applicant and appropriately augmented by the device and/or third party data is received, a quotation is issued, step 650. An insurance card may then be outputted by the system, step 660. It is contemplated that in a new applicant or customer context that the user selectable input, device data and third party data are used to establish the quote but in a current, renewal or repeat customer context, the information may be supplemented with historical insurance company entity data about the existing customer.

One or more steps of method 600 may be implemented as computer program instructions provided on a non-transitory computer readable medium for execution by one or more processors. As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Figure 7:
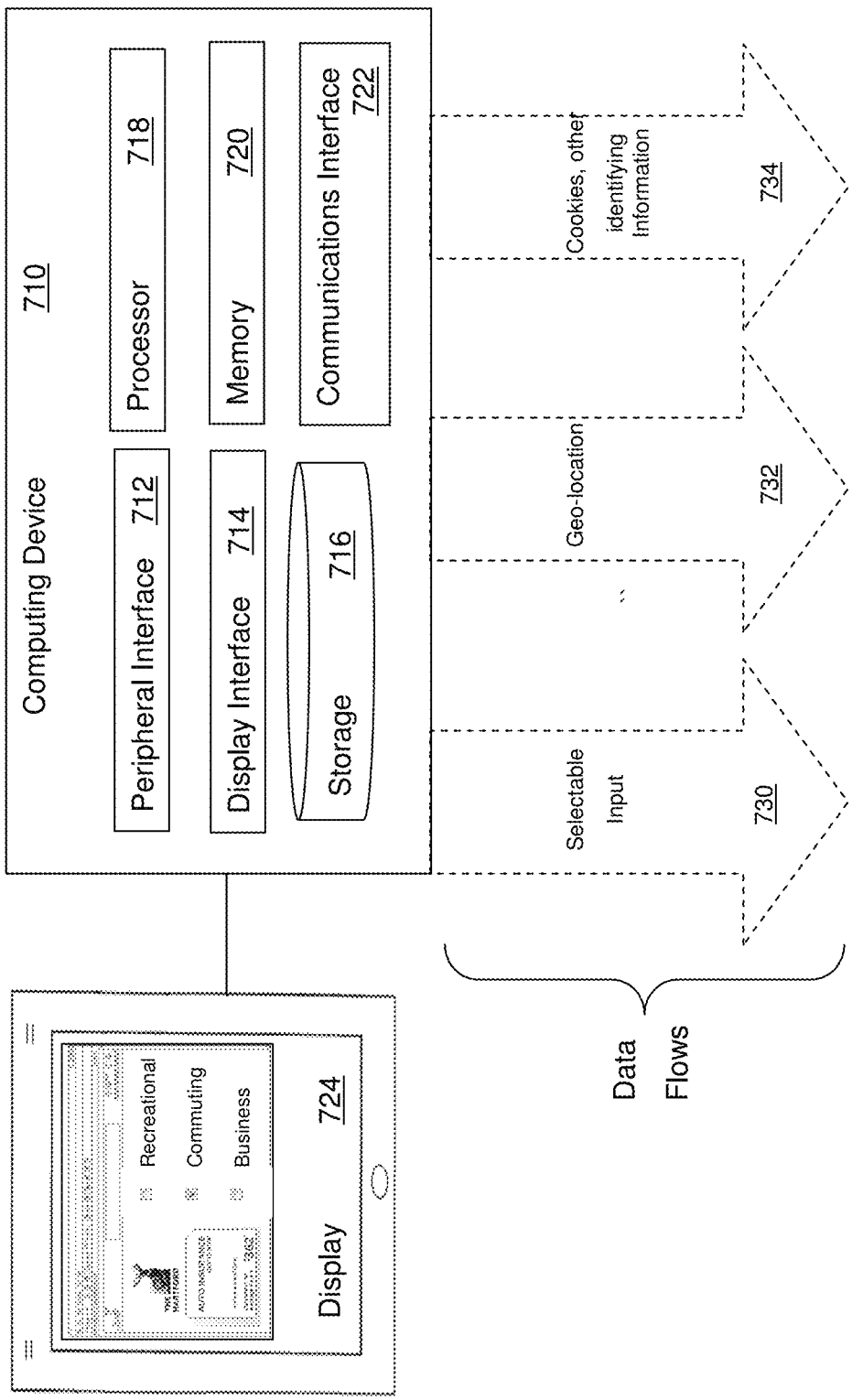
FIG. 7 shows another exemplary device of the present invention.

FIG. 7 shows an example computing device 710 that may be used to implement features describe above. The computing device 710 may include a peripheral device interface 712, display device interface 714, a storage device 716, a processor 718, a memory device 720, and a communication interface 722. Computing device 710 may be coupled to a display device 724, which may be separately coupled to or included within the computing device 710. In operation, computing device 710 is configured to receive and transmit a number of data flows via communications interface 722 including, for example, selectable input data 730, Geo location/identifying information 732 and other cookie-type identifying data 736. In the present invention, geo-location or GPS type information from the user's computing device may be used to provide location based information for use in the quotation such as information related to where the user resides, travels, where the car(s) are garaged, etc. Any number of location based methodologies, protocols and technologies may be utilized to acquire the location based information including but not limited to Assisted GPS (A-GPS) W3C Geolocation GSM localization, Time Difference Of Arrival (TDOA), etc. Additionally, it is contemplated that a number of different types of information methodologies and protocols may be used to provide information about the applicant from their device including device type, serial number, machine number, evercookies, flash cookies, session beans, session IDs or other similar means for providing information to the insurance entity for the quoting process.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712. The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 710. The memory device 720 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by the consumer client device 130 as described with respect to FIG. 1. In such an instance, the memory device 720 and/or the storage device 716 may store instructions which, when executed by the processor 718, cause the processor 718 to perform any feature or any combination of features described above as performed by the web browser module 134. Alternatively or additionally, in such an instance, each or any of the features described above as performed by the web browser module 134 may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the insurance data management system 110. In such an instance, the memory device 720 and/or the storage device 716 may store instructions which, when executed by the processor 718, cause the processor 718 to perform any feature or any combination of features described above as performed by the interface module 112 and/or the insurance quote calculation module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the financial web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Figure 8:
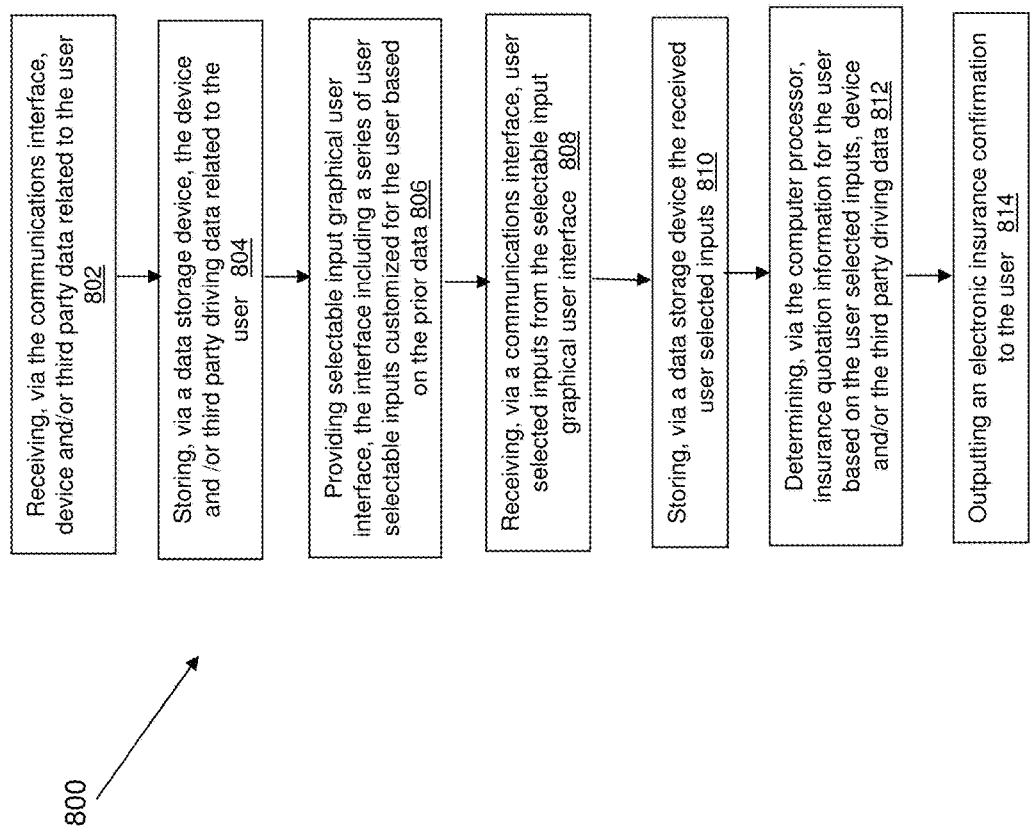
FIG. 8 shows another exemplary method of the present invention.

FIG. 8 shows an example process flow diagram illustrating another method 800 for administering an electronic insurance quoting process using the example architecture 100 of FIG. 1. The method 800 of FIG. 8 may begin by receiving, via a communications interface, device and/or third party data related to the user, step 802. It is contemplated that the user's consent to access such information may be garnered in advance such as via an electronic disclosure and consent form. Method 800 further proceeds with storing, via a data storage device, the device and/or third party driving data related to the user, step 804. Method 800 proceeds by providing a selectable input graphical user interface, the interface including a series of user selectable inputs that may be customized based on the data storage device, the device and/or third party driving data, step 806. The inputs may be customized, for example, by providing selected ranges of data, such as age, income, etc. that corresponds to that specific user based on the data garnered in step 802. Method 800 continues with receiving, via a communications interface, user selected inputs from the selectable input graphical user interface, step 808. Method 800 continues with storing, via a data storage device the received user selected inputs, step 810. Method 800 further continues with determining, via the computer processor, insurance quotation information for the user based on the user selected inputs, device data and/or the third party driving data, step 812. Method 800 proceeds with outputting an electronic insurance confirmation to the user, step 814.

Although the methods and features described above with reference to FIGS. 1-8 are described above as performed using the example architecture 100 of FIG. 1 and the example system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described above with reference to FIGS. 1-8 may be used alone without the other features and elements or in various combinations with or without other features and elements. Sub-elements of the methods and features described above with reference to FIGS. 1-8 may be performed in any arbitrary order (including concurrently), in any combination or sub-combination.

What is claimed is:

1. A computer system, comprising:
   one or more data storage devices for storing data indicative of inputs received from a user device;
   one or more computer processors in communication with the one or more data storage devices;
   a memory, coupled to the one or more computer processors, storing program instructions which, when executed by the one or more computer processors, cause the one or more computer processors to:

transmit to a user device for display a data entry interface, the data entry interface including user selectable graphical elements not displayed as a keyboard;
receive from the user device data indicative of user selections of the user selectable graphical elements not displayed as a keyboard;
responsive to receipt of the user selections of the user selectable graphical elements not displayed as a keyboard, representative of a request for a quote for insurance, interrogate the user device for user information;
receive, responsive to the interrogation of the user device, user information;
initiate a request to a third party data source for information relating to the user;
receive, in response to the request, data indicative of the information relating to the user from the third party data source;
provide, to an insurance data management system, the data indicative of user selections of the user selectable graphical elements not displayed as a keyboard, the user information received from the user device identifying information received in response to the interrogation and the data indicative of the information relating to the user received responsive to the request to the third party data source;
receive, in response to the providing, from the insurance data management system, an insurance quotation; and
output the insurance quotation to the remote user device for display.

2. The computer system of claim 1, wherein the user information provided in response to the interrogation of the user device comprises location based information.

3. The computer system of claim 2, wherein the location based information provided in response to the interrogation of the user device comprises at least one of user residence location information and user travel location information.

4. The computer system of claim 2, wherein the location based information provided in response to the interrogation of the user device comprises information indicative of where a vehicle is garaged.

5. The computer system of claim 2, wherein the location based information provided in response to the interrogation of the user device comprises global positioning system (GPS) information.

6. The computer system of claim 1, wherein the user information provided in response to the interrogation of the user device comprises user identifying information.

7. The computer system of claim 6, wherein the user identifying information provided in response to the interrogation of the user device comprises one or more of device type, serial number, machine number, evercookies, flash cookies, session beans and session IDs.

8. The computer system of claim 1, wherein the data entry interface does not accept keyboard-type information entry.

9. The computer system of claim 1, wherein the data entry interface is configured for data entry via one or more of: checkboxes; radio buttons; one or more taps; and one or more swipes.

10. The computer system of claim 1, wherein the third party data source comprises a source of at least one of motor vehicle data and driving history data.

11. A computer-implemented method, comprising:
transmitting, by one or more computer processors, to a user device for display, a graphical user interface, the graphical user interface configured for data entry without manual keyboard-based input;
receiving, by the one or more computer processors, data entered via the graphical user interface without manual keyboard-based input;
responsive to receiving the data entered via the graphical user interface without manual keyboard-based input, requesting, by the one or more computer processors, from the user device, user information;
receiving, by the one or more computer processors, in response to the request to the user device, user information;
requesting, by the one or more computer processors, from at least one third party data source, user information;
receiving, by the one or more computer processors, responsive to the request to the at least one third party data source, from the at least one third party data source, user information;
storing, by the one or more computer processors in one or more data storage devices, the received user information;
providing, by the one or more computer processors, to a second computer system, the data entered via the graphical user interface without manual keyboard-based input and the received user information from the user device and from the at least one third party data source;
receiving, by the one or more computer processors, from the second computer system, responsive to the providing, an insurance quotation; and
outputting, by the one or more computer processors, via the communication interface device, an electronic insurance quotation to the user device for display.

12. The computer-implemented method of claim 11, wherein the user information provided in response to the interrogation of the user device comprises location based information.

13. The computer-implemented method of claim 12, wherein the location based information provided in response to the interrogation of the user device comprises at least one of user residence location information and user travel location information.

14. The computer-implemented method of claim 12, wherein the location based information provided in response to the interrogation of the user device comprises information indicative of where a vehicle is garaged.

15. The computer-implemented method of claim 12, wherein the location based information provided in response to the interrogation of the user device comprises global positioning system (GPS) information.

16. The computer-implemented method of claim 11, wherein the user identifying information provided in response to the interrogation of the user device comprises one or more of device type, serial number, machine number, evercookies, flash cookies, session beans and session IDs.

17. The computer-implemented method of claim 11, wherein the graphical user interface is configured to accept both non-keyboard based data input and keyboard-type information entry.

18. A non-transitory computer-readable medium, having stored thereon processor-executable instructions, which instructions, when executed by one or more processors, cause the one or more processors to:
transmit to a user device for display a data entry interface, the data entry interface including user selectable graphical elements not displayed as a keyboard;

receive from the user device data indicative of user selections of the user selectable graphical elements not displayed as a keyboard;

responsive to receipt of the user selections of the user selectable graphical elements not displayed as a keyboard, representative of a request for a quote for insurance, interrogate the user device for user information;

receive, responsive to the interrogation of the user device, user information;

initiate a request to a third party data source for information relating to the user;

receive, in response to the request, data indicative of the information relating to the user from the third party data source;

provide, to an insurance data management system, the data indicative of user selections of the user selectable graphical elements not displayed as a keyboard, the user information received from the user device identifying information received in response to the interrogation and the data indicative of the information relating to the user received responsive to the request to the third party data source;

receive, in response to the providing, from the insurance data management system, an insurance quotation; and output the insurance quotation to the remote user device for display.

19. The non-transitory computer-readable medium of claim 18, wherein the instructions which cause the one or more computer processors to initiate a request to a third party computer system for information relating to the user comprise instructions which cause the one or more computer processors to initiate a request to a third party computer system for information relating to property associated with the user; and wherein the instructions which cause the one or more computer processors to receive the data indicative of the information relating to the user comprise instructions which cause the one or more computer processors to receive, from the third party computer system, data indicative of information relating to the property associated with the user.

20. The non-transitory computer-readable medium of claim 19, wherein the instructions which cause the one or more computer processors to initiate a request to a third party computer system for information relating to the property associated with the user comprise instructions which cause the one or more computer processors to initiate a request to a third party computer system for information relating to at least one vehicle associated with the user, and wherein the instructions which cause the one or more computer processors to receive the data indicative of the information relating to the property associated with the user comprise instructions which cause the one or more computer processors to receive, from the third party computer system, data indicative of information relating to the at least one vehicle associated with the user.

* * * * *